July 30, 1968 R. M. ROEN ET AL 3,395,281
CONTOUR TRACING APPARATUS INCLUDING PHOTOELECTRIC MEANS
FOR ANGULARLY POSITIONING THE TRACING STYLUS
Filed April 12, 1965 2 Sheets-Sheet 1
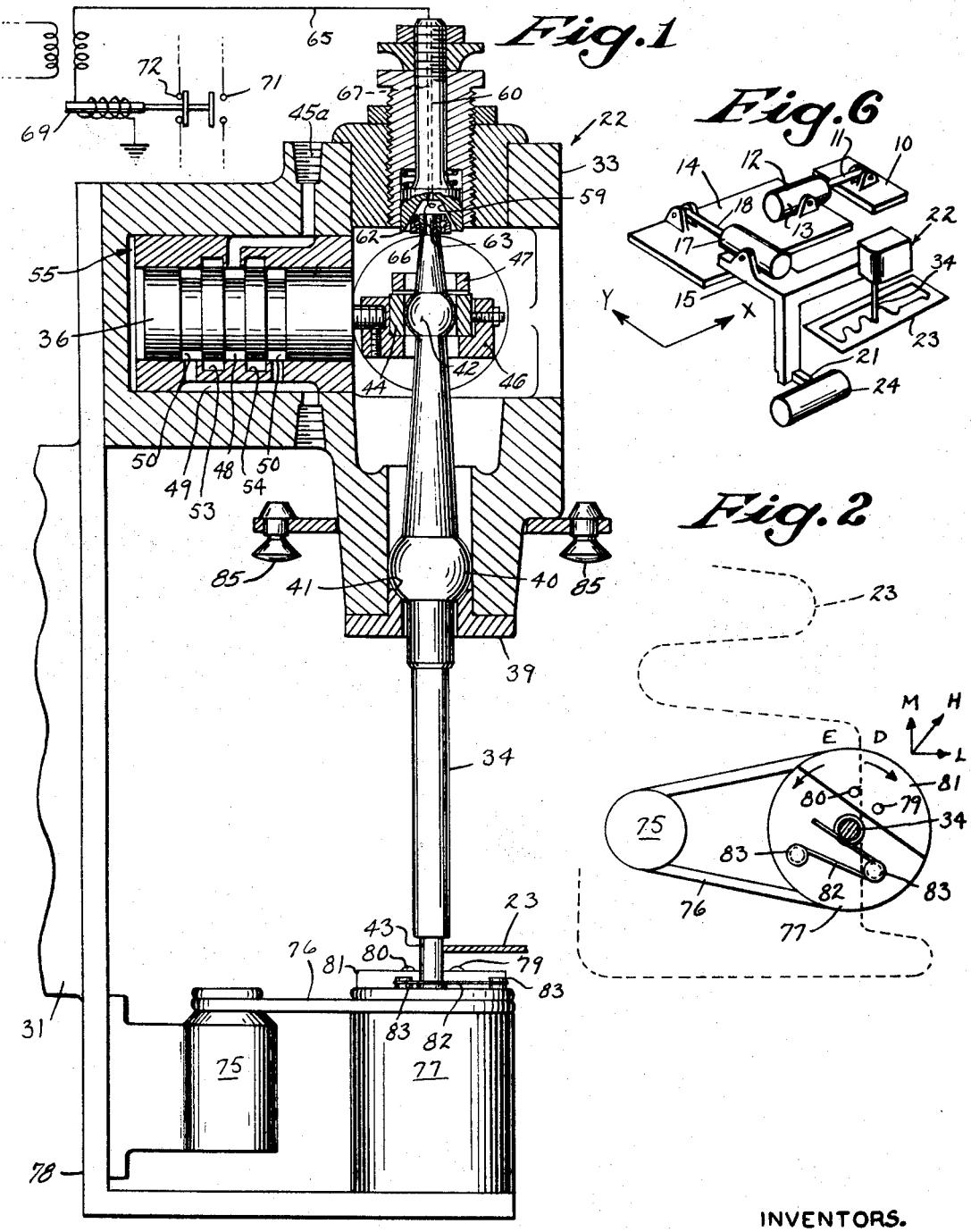
INVENTORS.
Ralph M. Roen
Richard E. Riebs
BY Robert W. Palmatier
ATTORNEY July 30, 1968 R. M. ROEN ETAL 3,395,281
CONTOUR TRACING APPARATUS INCLUDING PHOTOELECTRIC MEANS
FOR ANGULARLY POSITIONING THE TRACING STYLUS
Filed April 12, 1965 2 Sheets-Sheet 2
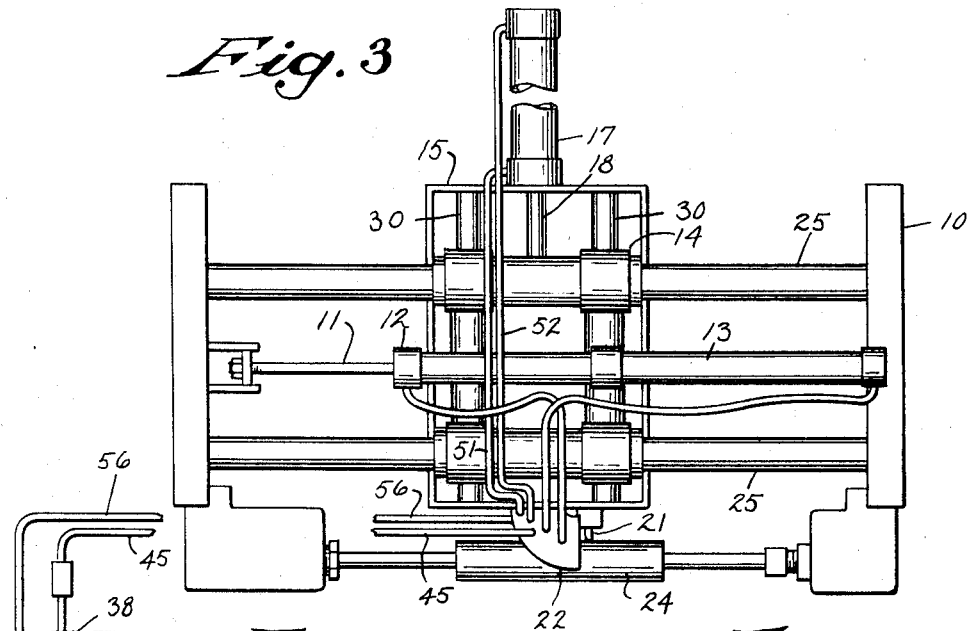
*Fig. 3*
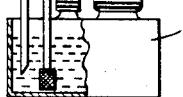
*Fig. 4*
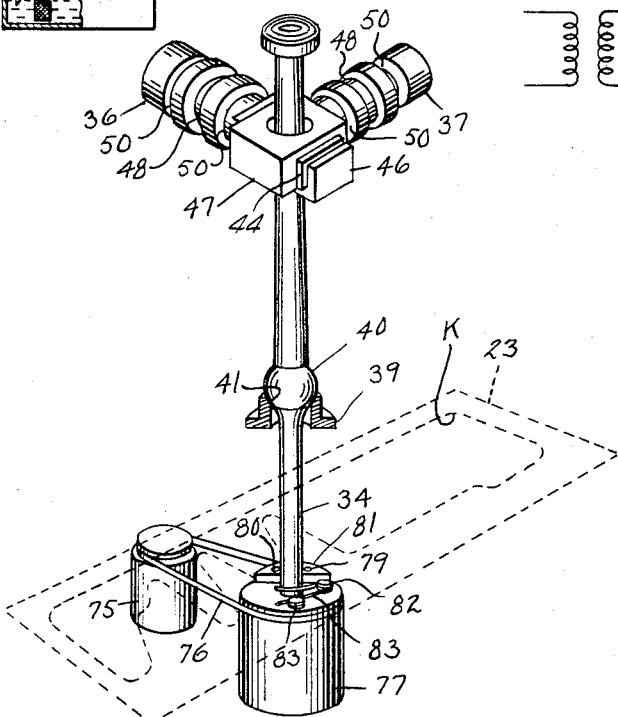
*Fig. 5*
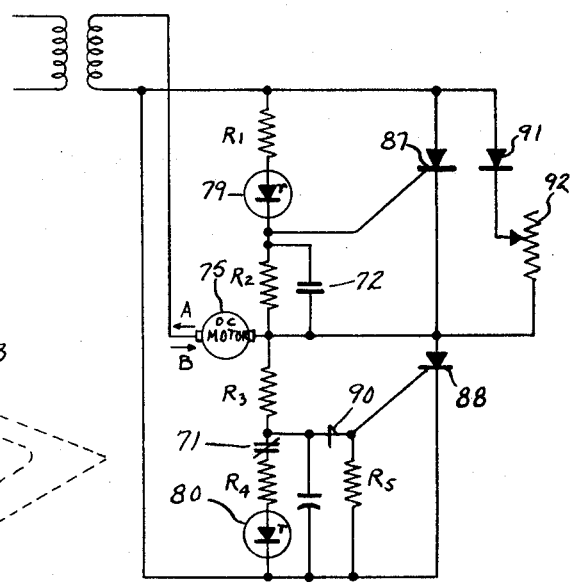
INVENTORS.
Ralph M. Roen
Richard E. Riebs
BY
ATTORNEY United States Patent Office 3,395,281
Patented July 30, 1968

3,395,281
CONTOUR TRACING APPARATUS INCLUDING PHOTOELECTRIC MEANS FOR ANGULARLY POSITIONING THE TRACING STYLUS
Ralph M. Roen, Milwaukee, and Richard E. Riebs, Hales Corners, Wis., assignors to McGraw-Edison Company, Milwaukee, Wis., a corporation of Delaware
Filed Apr. 12, 1965, Ser. No. 447,453
6 Claims. (Cl. 250—202)

ABSTRACT OF THE DISCLOSURE

A contour tracing apparatus for causing a tool or other device to progress along a predetermined path, using photosensitive profile scanning means for angularly positioning the tracing stylus with respect to the template edge being traced.

This invention relates to a contour tracing apparatus and more particularly a device for causing a tool or other device to progress along a predetermined path using a photo sensitive profile scanning device which progresses along the contour of a template and controls a pair of angularly disposed servomotors.

In a preferred form of the invention shown hereafter a tool is directed with respect to a work piece by a pair of servomotors or hydraulic rams which are controlled by a photo sensitive tracing device for tracking the contour of a template. The tracking device includes a stylus which contacts the template at its lower end and is pivotally mounted for limited movement in any horizontal direction which effects independent or simultaneous operation of the servomotors to move the tool in any horizontal direction. Deflection of the stylus is effected by a scanning head which includes a biasing member that engages the stylus. The direction of application of the biasing force is controlled by a pair of light sensitive diodes which control the rotation of the scanning head to so direct the biasing force in such manner that it is resolved into a first component which maintains contact between the stylus and the template and a second component in the direction of the tangent of the point of contact between the stylus and the template to cause deflection of the stylus in the desired direction of travel.

It is an object of this invention to provide an improved high speed tracing device for following the contour of a template.

It is also an object of this invention to provide a photo sensitive scanning device for controlling an associated apparatus.

It is a further object of this invention to provide an improved tracing device for automatically following the contour of a template.

It is a further object of this invention to provide a device for angularly positioning an apparatus with respect to the contour of a template.

These and other objects and advantages of this invention will become apparent from the following description when taken in connection with the accompanying drawings, wherein:

FIGURE 1 is a vertical section partially broken away of a portion of a turning machine showing the optical tracer of this invention with a portion of the electrical circuit associated therewith schematically shown;

FIGURE 2 is a partial sectional plan view of a portion of the tracer mechanism showing the optical scanning member, drive motor, the stylus in section and a portion of the template edge in phantom view;

FIGURE 3 is a schematic view of a turning machine utilizing the tracer of this invention;

FIGURE 4 shows the stylus and associated valve spools, scanning head and drive motor therefor with the template in phantom view;

FIGURE 5 shows the wiring diagram for the control of the rotation of the optical scanning head; and FIGURE 6 is a schematic showing of representative portions of the turning machine of FIGURE 3.

The apparatus to be described hereafter will automatically trace along a template to reproduce the contour of any two-dimensional configuration within the limits of the traverse of the associated machine. The tracing of the template is accomplished by photo sensitive means which orient the scanning mechanism to control the actuation of servomotors. In the illustrated embodiment, a turning machine is shown using a template presenting an internal closed contour which is traced in a counterclockwise direction as viewed from above to make two passes with respect to the rotating work with a single scanning of the template contour.

The general construction of the device in the environment of a tracing machine is shown schematically in FIGURES 3 and 6. In the diagrammatic showing of FIGURE 6 a stationary machine bed or frame 10 is connected to rod 11 of a double-acting hydraulic ram or motor 12, the cylinder 13 of which is carried by a carriage 14 mounted on the machine frame 10 for linear motion in one horizontal direction as, for example, along the X axis indicated. A second carriage 15 is mounted on the carriage 14 for relative sliding motion with respect thereto in a horizontal direction indicated by the Y axis perpendicular to the direction indicated by the X axis. This relative movement is accomplished by a double-acting hydraulic motor or ram 17 that has the rod 18 thereof connected to the carriage 14 and the cylinder 17 secured to the carriage 15. The carriage 15 carries the tool 21 and the tracer device 22 which move in unison therewith. The template 23 and work 24 are carried by the machine frame 10 with the template 23 secured to the frame and the work 24 supported by the frame and rotated about its longitudinal axis. It will be recognized that the work piece may be carried by the carriage 15 and the tool could be mounted on the frame 10 to achieve the same result.

As seen in FIGURE 3, the machine frame 10 has a pair of parallel stationary rod members 25. The carriage 14 is a casting which has a pair of cylindrical bores journaled about shaft members 25 for longitudinal sliding movement with respect to the frame 10. Relative movement is effected by the double-acting hydraulic motor 12 carried by the casting with the rod portion secured to the machine frame 10. Underlying the longitudinal rod members 25 is a pair of parallel shaft members 30 carried by carriage 15 received in a second pair of cylindrical bores extending transversely through the casting forming carriage 14. The double-acting motor 17 has its cylinder secured to the frame portion of carriage 15 and rod 18 connected to carriage 14.

The tracer mechanism 22, secured to carriage 15, controls a flow of high pressure hydraulic fluid to the hydraulic motors 12 and 17 to effect movement of the tool 21 in any horizontal direction by cooperating simultaneous operation of the hydraulic motors.

The tracing mechanism 22, shown in section in FIGURE 1, includes a housing portion 33 secured to carriage 15 with a depending stylus 34 that contacts the template 23 near its lower end and is connected to a pair of valve spools 36, 37 adjacent its upper end to control the lateral and transverse movement of the carriage with respect to the work as directed by the contact between stylus 34 and template 23.

The stylus is retained in the housing by a collar 39 which supports spherical portion 40 of stylus 34 on the frusto-spherical collar surface 41 and provides a pivotal support intermediate the spool valve actuating spherical portion 42 and the template contacting portion 43. The cylindrical surface of the bore through the block 44 contacts the spherical surface of the stylus portion 42 with the block 44 confined within the clevis members 46, 47 which are disposed at right angles to one another and are each respectively attached by one leg to valve spools 36, 37. Accordingly, pivoting of the stylus causes axial sliding movement of one or both of the valve spools 36, 37.

The spool valve 55 receives high pressure hydraulic fluid from the pump 38 through line 45 which connects to housing opening 45a which communicates with the annular recess 48 of spool 36. The return line 56 is connected to the valve passage 49 which is in communication with the annular recesses 50 of the spool. Internal passageways (not shown) interconnect the pressure conduits 51, 52 respectively with the annular recesses 53, 54 in the valve cylinder wall.

Referring also to FIGURE 1 when the lower end 43 of stylus 34 is deflected to the left by template 23, the valve spool 36 is moved to the right. This displacement of the valve spool places the spool recess 48 in communication with the valve wall recess 54 to deliver high pressure hydraulic fluid through conduit 52 to the cylinder causing the carriage to move away from the work piece. Simultaneously, passage 49 and valve wall recess 53 are interconnected by spool recess 50 to permit hydraulic fluid at the opposite side of the hydraulic motor piston to be returned through conduit 56 to the reservoir 57.

In a like manner the spool 37 disposed at right angles to spool 36 may be displaced by the stylus 34 to actuate double-acting hydraulic motor 12 and move carriage 14 and consequently carriage 15 which is carried thereby in a horizontal direction at right angles to the motion initiated by the hydraulic motor 17. Unles the stylus is deflected to cause motion solely in either of the directions indicated by the X or Y axes in FIGURE 1, the resulting motion is caused by the simultaneous functioning of both spool valves causing motion of both hydraulic motors. By simultaneous proportioned deflection of both valve spools 36 and 37, motion in any horizontal direction may be effected.

The valve and stylus arrangement as described herein is shown in substantially the same form but in greater detail in U.S. Patent 2,753,145.

Under certain operating conditions the friction induced by the contact between the upper terminal end of the stylus and the frusto-conical surface 59 of adjustment member 60 may inhibit free rotation of the stylus 34 to cause an improper response or a delayed response when the lower end of stylus is simultaneously engaging template 23. To avoid this condition, a ball bearing 62 has been mounted at the upper end of stylus 34 to reduce friction when the stylus engages the surface 59.

The ball bearing 62 is electrically isolated from the the stylus by an insulating collar 63. A conductor 65 terminates in contact with the bearing 62 being placed between the insulating collar 63 and the inner race 66 and extends upwardly through an axial opening 67 through adjusting member 60 and is connected to a relay 69. When the stylus is deflected with the outer race of bearing 62 engaging the surface 59 of the adjusting member 60 relay 69 is actuated closing contacts 71 and when the bearing outer race is out of contact with the surface 59 relay 69 is de-activated closing contacts 72 and opening the previously closed contacts 71. In FIGURE 1 the relay 69 is shown in a de-activated condition wherein contacts 72 are closed and contacts 71 are open.

The optical tracking mechanism, as illustrated in FIGURES 1, 2 and 4, includes a direct current motor 75 which through a belt 76 drives a scanning head 77. The scanning head 77 is rotatably mounted on the bracket 78 carried by the carriage 15 by a means not shown and is freely rotatable in response to the torque supplied by motor 75 through a belt 76.

The scanning head 77 includes a pair of light sensitive diodes 79, 80 mounted on a raised portion 81 and a spring 82 mounted about pins 83 which engages the lower end portion 43 of stylus 34 and exerts a resultant force against the stylus that acts in the direction of the arrow H of FIGURE 2 intermediate the light sensitive diodes 79, 80.

A pair of spotlights 85 emit downwardly directed light calculated to be received by the diodes 79, 80 whenever the latter are not shielded by the template 23.

Referring to FIGURE 5, the diodes 79 and 80 are identical and become conductive in the presence of light, but are placed within the electrical circuit so that the portion of the circuit associated with diode 79 is activated when diode 79 is exposed to light (diode 79 would normally be disposed beneath the template and shielded from the light) and the portion of the circuit associated with diode 80 is activated when diode 80 ceases to receive light by being in the shadow of the template (diode 80 is normally exposed to the light source).

As seen in the wiring diagram, the D.C. motor 75 which drives the scanning head 77 is supplied with current from a transformer secondary coil. Diode 79 normally underlies the template, thereby being shielded from the light source and during such period in nonconductive. When diode 79 arrives at a position where it receives light it becomes conductive causing a current through resistance $R_1$ to be supplied to the gate of silicon controlled rectifier 87 switching the rectifier to high conductance. The silicon controlled rectifier, when thus conductive, affords half wave rectification to supply a pulsating direct current to motor 75 in the direction of arrow A, whereupon the motor rotates the scanning head 77 in the direction indicated by arrow D as seen in FIGURE 2. When diode 79 is again shielded, the flow of current to the gate of silicon controlled rectifier 87 is interrupted and the forward blocking capability of rectifier 87 is re-established by the next half cycle of current reversal thereby terminating actuation of the motor by current flow through the circuit branch including silicon controlled rectifier 87. A path for leakage current is provided by resistance $R_2$.

The diode 80 which is normally exposed to the light source, controls a second silicon controlled rectifier 88. When diode 80 is exposed to the light source, a voltage is impressed across resistances $R_3$ and $R_4$ with trigger diode 90 subjected to a voltage lower than its breakover voltage causing it to remain nonconductive. When the diode becomes shielded from the light source by being disposed in a position underlying the template, it ceases to conduct causing the voltage impressed on the trigger diode 90 to be greater than its breakover voltage resulting in a current flow to the gate of silicon controlled rectifier 88. When the silicon controlled rectifier 88 is thus "turned on" a pulsating direct current is passed through the D.C. motor in the direction indicated by the arrow B causing scanning head 77 to rotate in the direction indicated by arrow E and opposite the direction of rotation induced by the current in the direction A. Leakage resistance $R_5$ is provided to assure prompt termination of the conductivity of silicon controlled rectifier 88 when trigger diode 90 ceases to be conductive. It will be noted that in the wiring diagram of FIGURE 5, the relay 69 of FIGURE 1 is in an actuated position with contacts 71 closed and contacts 72 open so that the illustrated circuit is representative of the condition that exists when the scanning head 77 is automatically tracking the contour of template 23.

To prevent the circuit from being satified with the diode 79 underlying the template and the diode 80 exposed to the light source a third current path or hunting circuit is provided by the rectifier 91 and potentiometer 92. This parallels silicon controlled rectifier 79, and permits a small current to flow through motor 75 in the direction of arrow A. Accordingly, when no current is flowing through the silicon controlled rectifiers 79 or 80 the rectifier 91 permits a current flow in the direction A which is of smaller magnitude than the current supplied when either of silicon controlled rectifiers is operative. When either of the silicon controlled rectifiers 87 or 88 is activated the current flow associated therewith is of such a magnitude that the hunting circuit is overpowered and in effect, removed from the circuit during the period of such operativeness.

When operating at normal tracking speeds and without abrupt changes in the contour of the template the scanning head will normally track the template contour with the diode 80 moving along the margin of template 23 alternately into and out of a position underlying the margin of the template as the hunting circuit turns the scanning head in the direction of arrow D until the light to diode B is interrupted whereupon silicon controlled rectifier 88 becomes conductive causing a current in the direction of arrow B and induces scanning head 77 to move in the direction of the arrow E until diode B is again exposed to the light. As a consequence the circuit causes motor 75 to frequently reverse making the tracking action more sensitive and quickly responsive.

The spring 82 biases the stylus 34 with a resultant force acting along the line indicated by vector H which approximately bisects a line between the centers of the diodes 79, 80. The direction of the vector is normally disposed at about a 45 degree angle to the tangent of the template at the point of contact between the stylus and template. The biasing force thereby has one component perpendicular to the point of contact with the template that urges the stylus into contact with the template and a second component parallel to the tangent to the template at the point of contact which causes the stylus to deflect in the direction of such second component.

Under certain circumstances it is possible for the stylus to be stopped in a position where although the scanning head is reversing direction and seeking, there is no biasing force component in the direction of travel sufficient to cause deflection of the stylus and the tracking thereupon stops. Under such conditions the upper end of the stylus is at a null or concentric position with respect to the adjustment member 60 causing the ball bearing 62 to move out of contact with the frusto-conical surface 59. The circuit energizing the relay is then interrupted causing contacts 71 to open and contacts 72 to close as shown in FIGURE 1, which gives the same electrical response as occurs when both diodes are shielded from the light source. The current flows in the direction of arrow B and the scanning head turns in the direction E until the biasing force is rotated sufficiently to again cause deflection of the stylus. As soon as the stylus is again deflected the relay is again energized closing contacts 71 and opening contacts 72 to re-establish the normal tracking circuit as indicated in FIGURE 5.

In the machine embodiment illustrated a template is used which presents a continuous closed curve. The operation is started at point K (FIGURE 4) and traces counterclockwise about the template contour to provide two passes of the work piece while scanning the profile of the template once. The scanning device and tool are carried by the carriage 15 and the template and work are mounted on the machine frame 10. The scanning head tracks the contour of the template maintaining the approximate attitude of FIGURE 2 with the diode 80 moving alternately back and forth across the profile of the template from the position of FIGURE 2 to a location just beneath the margin of the template to interrupt light supply to diode 80. In seeking angularly back and forth, a mean angle of about 45 degrees is maintained between the vector of the biasing force and the tangent to the stylus at the point of contact with the template.

Although but one embodiment has been shown and described, it will be apparent to those skilled in the art that various changes and modications may be made therein without departing from the spirit of the invention or from the scope of the appended claims.

What is claimed is:

1. In a contour tracing apparatus having a template; a support structure for a tool or work piece, and a pair of cooperating servomotors to move said structure selectively along X and Y coordinates the improvement which comprises sensing means for contacting the contour of said template, said sensing means being operatively connected to said servomotors; biasing means engaging and exerting biasing force on said sensing means; and photo sensitive means for positioning said biasing means to provide one component of said biasing force for maintaining contact between said sensing means and said template and another component of said force in the direction of the tangent to the template at the point of contact with the sensing means.

2. In a contour tracing apparatus having a template, a support structure for a tool or work piece, and a pair of cooperating servomotors to move said structure selectively along X and Y coordinates the improvement which comprises sensing means for contacting the contour of said template, said sensing means being operatively connected to said servomotors; biasing means engaging and exerting a biasing force on said sensing means; photo sensitive means confronting one side of the plane of the template; illumination means confronting the other side of the plane of said template opposite said one side; a photo sensitive means being operative to position said biasing means to provide one component of said biasing force for maintaining contact between said sensing means and said template and another component of said biasing force in the direction of the tangent to the template at the point of contact with the sensing means.

3. A contour tracing apparatus comprising a template; a support structure for a tool or work piece; a pair of cooperating servomotors to move said structure selectively along X and Y coordinates; sensing means operatively connected to said servomotors and presenting a portion thereof for contacting the contour of said template; a scanning member rotatably mounted on said support; biasing means on said scanning member engaging and exerting a biasing force on said sensing means; reversible drive means for rotating said scanning member; illuminating means confronting one side of the plane of the template; photo sensitive means carried by said scanning member in confronting relation to the side of the plane of said template opposite said one side; controlled switch means having control means connected to said photo sensitive means to cause said drive member to rotate said scanning member in one pivotal direction when said photo sensitive means activates said controlled means and means to cause said drive member to rotate said scanning member in the opposite of said one pivotal direction when said controlled switch means is de-activated, said scanning member being controlled by said photo sensitive means to direct said biasing force such that one component thereof is exerted against said sensing means to maintain engagement between said sensing means portion and said template and another component of said biasing force is exerted in the direction of the tangent to the template at the point of contact with said sensing means.

4. A contour tracing apparatus comprising a template; a support structure for a tool or work piece; a pair of cooperating servomotors to move said structure selectively along X and Y coordinates; sensing means carried by said support for contacting the contour of said template, said sensing means being operatively connected to said servomotors; a scanning member rotatably mounted on said support; biasing means on said scanning member engaging and exerting a biasing force on said sensing member; reversible drive means for rotating said scanning member; illuminating means confronting one side of the plane of said template; first and second photo sensitive means carried by said scanning member in angularly spaced relation to one another and in confronting relation to the side of the plane of said template opposite said one side; first rectifier means having control means connected to said first photo sensitive means to make said first rectifier means conductive when activated by said first photo sensitive means; second rectifier means having control means connected to said second photo sensitive means to make said second rectifier means conductive when actuated by said photo sensitive means, said first and second rectifier means being electrically in parallel with one another and in series with said drive means to rotate said scanning head in one direction when said first rectifier means is conductive and in the opposite of said one direction when said second rectifier means is conductive; third rectifier means including a resistance in series therewith, connected to said drive means to rotate said scanning head in said one direction when neither said first nor said second rectifier means is conductive, said scanning member being controlled by said photo sensitive means to direct said biasing force such that one component thereof exerted against said sensing means maintains engagement between asid sensing means and said template and another component of said biasing force is exerted in the direction of the tangent to the template at the point of contact with said sensing means.

5. A contour tracing apparatus comprising a template; a supporting structure for a tool or work piece; a pair of cooperating servomotors respectively effective to move said structure along X and Y coordinates; a sensing element carried by said supporting structure directly and yieldingly engaging the contour of said template; operating control means connected to said sensing element and said servomotors to translate sensing element deflection to support structure movement; a rotatable tracking mechanism carried by said supporting structure adjacent said sensing element and generally coaxial with said sensing element when the latter is in a nondeflected position; first and second photo sensitive elements mounted in an angularly spaced adjoining relation on said tracking mechanism, said photo sensitive elements being disposed at one side of and in confronting relation to the plane of said template; biasing means carried by said tracking mechanism and engaging said sensing element to exert a force having a resultant vector extending between said first and second photo sensitive elements; a light source disposed to emit light toward said template from the side of the plane of said template opposite said one side and reversible drive means controlled by said photo sensitive elements and operative to rotate said tracking mechanism.

6. A contour tracing apparatus comprising a template; a supporting structure for a tool or work piece; a pair of cooperating servomotors effective to move said structure along X and Y coordinates; a sensing element directly and yieldingly engaging the contour of said template; operating control connections between said sensing element and said servomotors to translate deflection of said sensing element to servomotor actuation; biasing means urging said sensing element in a predetermined direction; photo sensitive means orienting said biasing means to dispose a component of the biasing force in the direction of sensing element travel to induce said sensing element to travel along edge surface of said template.

References Cited
UNITED STATES PATENTS

| | | |
|---|---|---|
| 2,208,420 | 7/1940 | Gulliksen. |
| 2,444,261 | 6/1948 | Kelling _____ 250—202 X |
| 2,486,334 | 10/1949 | Slamar. |
| 2,678,496 | 5/1954 | Martin _____ 318—20.155 X |
| 2,723,845 | 11/1955 | Przybylski et al. __ 318—20.155 X |
| 2,753,145 | 7/1956 | Rosebrook _____ 251—3 |
| 2,792,504 | 5/1957 | Slamar et al. |
| 2,994,783 | 8/1961 | Looschen. |
| 3,006,595 | 10/1961 | Rosebrook _____ 251—3 |
| 3,188,542 | 6/1965 | Dietrich _____ 318—345 X |
| 3,215,914 | 11/1965 | Patterson _____ 318—20.155 |
| 3,232,547 | 1/1966 | Thiede et al. |

RALPH G. NILSON, *Primary Examiner.*

M. A. LEAVITT, *Assistant Examiner.*